United States Patent

Sorenson et al.

[15] 3,685,565
[45] Aug. 22, 1972

[54] ADAPTER FOR TIRE CHANGING STAND

[72] Inventors: Billy L. Sorenson; Elmer J. Strang, both of Fort Dodge, Iowa

[73] Assignee: The Coats Company, Inc.

[22] Filed: March 8, 1971

[21] Appl. No.: 121,961

[52] U.S. Cl..............................................157/1.24
[51] Int. Cl............................................B60c 25/06
[58] Field of Search..........157/1, 1.1, 1.17, 1.2, 1.22, 157/1.24, 1.26, 1.28

[56] References Cited

UNITED STATES PATENTS

| | | | |
|---|---|---|---|
| 3,211,206 | 10/1965 | Garthe | 157/1.24 |
| 3,286,760 | 11/1966 | Riepen | 157/1.1 |
| 3,474,840 | 10/1969 | Scott | 157/1.24 X |
| 3,580,320 | 5/1971 | Roberts | 157/1.24 |

Primary Examiner—Granville Y. Custer, Jr.
Attorney—Hofgren, Wegner, Allen, Stellman & McCord

[57] ABSTRACT

A tire changing stand characterized by the provision of a peripheral configuration for accepting specific interior rim configurations and further the provision of a movable inner plate having bolt receiving holes keyed to a master positioning slot for receiving wheel rims of different numbers and sizes of bolt holes.

10 Claims, 7 Drawing Figures

INVENTORS
BILLY L. SORENSEN
ELMER J. STRANG
BY Hofgren, Wegner, Allen, Stellman & McCord
ATTORNEYS

ADAPTER FOR TIRE CHANGING STAND

BACKGROUND OF THE INVENTION

1. Field of the Invention

This invention relates to tire changing equipment and more particularly to an adapter for use with a tire changing stand.

2. Brief Description of the Prior Art

Tire changing stands having a center post for receiving a wheel rim are common in the art. One prime example of such stands is shown in the Strang et al, U.S. Pat. No. 3,255,800. Generally speaking, in such tire changing stands, the wheel rim receiving surface has a medially upstanding post over which the wheel rim is impaled when the rim and tire are placed on the receiving surface. The post may be threaded so that a clamp member may be threadably received thereon to clamp the rim to the stand following the placement of the rim and tire on the rim receiving surface.

The recent advent of special or decorative wheel rims, such as those made of magnesium, aluminum, or using portions of non-metalic material for decorative purposes, have created problems with respect to performing the tire servicing function without marring or otherwise harming, the decorative rims. For example, holding a rim of magnesium on the tire changing stand by the threaded clamp member may gouge or otherwise mar the surface of the rim in the area immediately adjacent to the clamping member. Thus, efforts have been made in the art to provide adapters for use with tire changing stands which will enable the decorative rims to be received on the stand so that tire servicing functions may be performed without marring the decorative rims. One example of such attempts is shown in the Scott et al U.S. Pat. No. 3,474,840.

In addition to the decorative rims which have become prevelent in recent years, the overall size and configuration of rims has increasingly differed. Some rims are as small as 10 inches on some cars, whereas others are as large as 17 inches. Furthermore, some rims mount by means of a plurality of bolt holes positioned around a greatly enlarged center opening. It has been necessary to provide a plurality of adapter elements for use with tire changing stands to accommodate wheels which were extremely wide or made of decorative material to accommodate wheels of extremely small size, and to further accommodate wheel rims having unusual interior configurations.

It is the object of this invention to provide an improved adapter member for a tire changing stand which adapter is capable of adapting the tire changing stand to receive extremely small wheels, to receive wheel rims of unusual interior configurations and, to receive wheel rims of different numbers of holes wherein the location of bolt receiving holes for receiving bolts threaded through holes of decorative rims may be easily accomplished.

SUMMARY OF THE INVENTION

This invention is directed, in brief, to the provision of an improved multi-use adapter for a tire changing stand.

The best mode currently contemplated for carrying out the invention includes the provision of a member having a bottom plate, a medial movable plate, and a top plate. The periphery of the member is scalloped so as to permit the reception of wheel rims having bolt holes formed by a plurality of ears around the inner periphery of the rim. Moreover, the scalloped periphery extends from the adapter in the form of a divergent, interrupted flange, so as to provide a centering and seating surface for extremely small wheel rims.

The top, intermediate, and bottom plates all have a center opening for receiving the center shaft of the tire changing stand. In addition, they have an offset opening from the center for receiving the positioning pin of the tire changing stand when the stand is used with extremely small rims. The bottom plate has a small opening for receiving the reduced top of the positioning pin when the stand is utilized for decorative wheels. The top plate has an elongate slot which is oriented on the diametrically opposite side from the opening for receiving a positioning pin in the bottom plate, and this elongated slot in the top plate is to be positioned adjacent the bead-breaking shoes. The top plate further has slots therein spaced as necessary, for wheel rims having four, five, six or eight bolt holes. The middle plate has tapped bolt receiving holes therein and the middle plate is movably mounted between the top and bottom plates for servicing decorative wheel rims, bolt receiving holes underlying the elongated opening as well as one of the other openings in the top plate may be aligned by moving the middle plate following which bolts may be threaded through the decorative rim and the holes in the bolt receiving plate of the adapter. When the rim and tire are placed on the adapter plate, the weight of the rim and tire moves the plate down until the rim rests against the rim receiving surface on the stand. Following the initial securement with the bolts, a sleeve is telescoped over the center post until it is received within the center opening of the decorative rim. The sleeve is a radial flange which serves as a bearing surface for receiving the clamp member, but holds the clamp member against contact with the center opening of a decorative rim to prevent marring or damage thereto.

Figures 1, 2, 3:
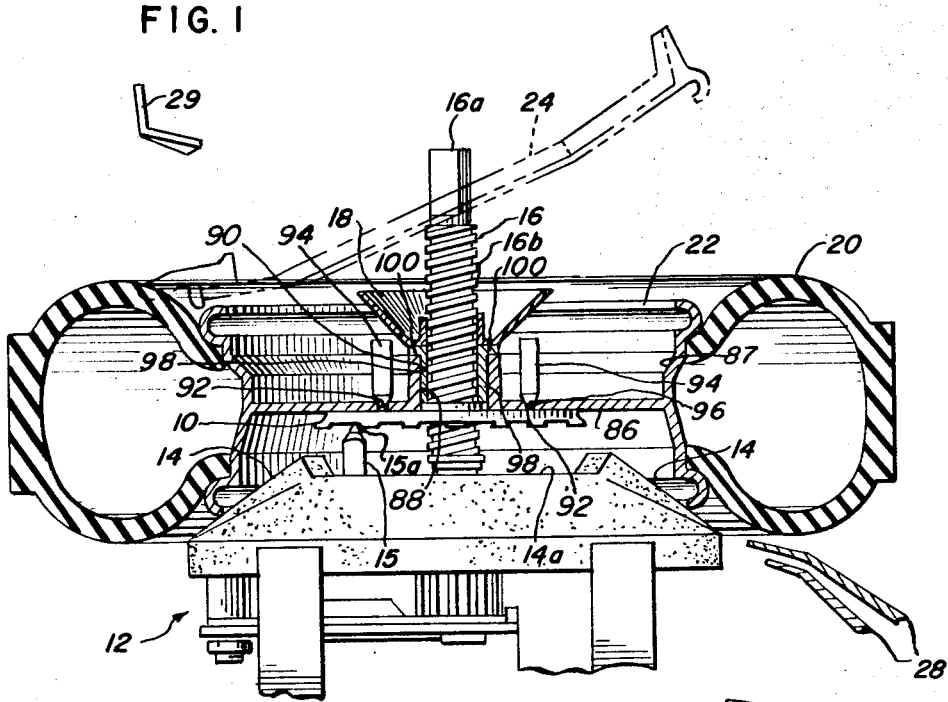
FIG. 1 is a fragmentary sectional view showing a portion of a tire changing stand with a rim and tire mounted on the stand by means of the adapter of this invention.
FIG. 2 is a perspective view of the adapter shown in use with a tire changing stand for receiving a so-called decorative wheel for mounting as shown in FIG. 1.
FIG. 3 is a perspective view of the adapter shown in use with a tire changing stand for receiving wheel rims of small dimension.
Figure 5:
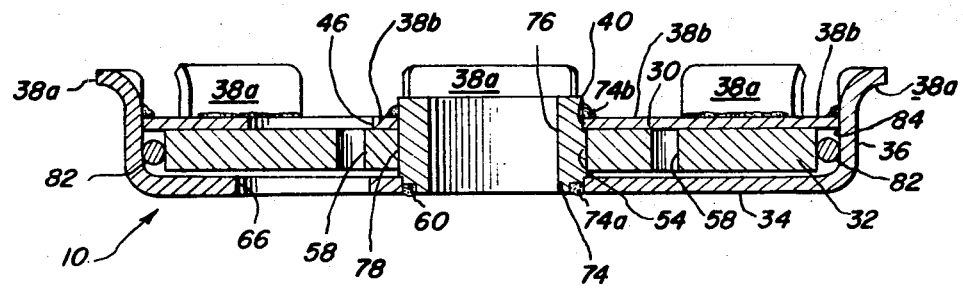
FIG. 5 is a section view taken generally along the line 5—5 of FIG. 4.

While this invention is susceptible of embodiment in many different forms, there is shown in the drawings and will herein be described in detail a specific embodiment therefor, with the understanding that the present disclosure is to be considered as an exemplification of the principles of the invention and is not intended to limit the invention to the embodiment illustrated.

DESCRIPTION OF THE PREFERRED EMBODIMENT

The adapter 10 of this invention is shown in use with a tire changing stand 12, preferably of the type described and claimed in Strang et al., U.S. Pat. No. 3,255,800. Generally speaking, the tire changing stand 12 includes a two portion rim supporting surface 14 having a recess or well 14a intermediate the two portions. A positioning pin 15 protrudes upwardly through the recess or well 14a and terminates in a reduced end 15a. A column 16 extends uprightly from the central portion of the recess 14a and includes a rotatable tire tool driving extension 16a protruding outwardly from the free end of the column 16. The periphery of the column is threaded as shown, at 16b for threadably receiving a conical clamp member 18. The rim receiving surface 14, recess 14a, and column 16 generally define a rim or wheel receiving area.

In use, a tire 20 may be mounted or demounted with respect to a vehicle rim 22 with the stand 12, through the aid of a tire tool 24, preferably of the type shown and claimed in Strang U.S. Pat. No. 3,247,883, by means of operation of the stand 12 including the functioning of lower and upper bead breaker components 28, 29, which first serve to separate the lower and upper beads of tire 20 from the vehicle rim 22. This invention is directed to an improved adapter 10 for holding rims of certain structure relative to the tire changing stand 12 during the tire changing operation in such a fashion as to securely retain the rim for the necessary steps of the tire changing operation without marring, gouging, or otherwise abusing the rim.

Generally speaking, the adapter 10 of this invention is comprised of three main components. The adapter 10 includes a bottom panel or plate 30, an intermediate panel or plate 32 and a top plate 34, which has a depending annular flange 36 for embracing the intermediate and bottom plates 32 and 30 therein, which flange 36 terminates in a scalloped edge 38 comprised of a plurality of divergent, downwardly outwardly flared skirt portions 38a, separated by recessed areas 38b.

The bottom plate 30 has a plurality of slots or openings therein, including a center opening 40 for receiving the column 16 and an enlarged, radially extending, position pin body receiving slot 42. A positioning pin tip receiving opening 44 is circumferentially displaced from the slot 42. The bottom plate 30 further includes a radially elongated master bolt hole alignment slot 46 which is generally, but not exactly, opposite the center opening 40 from the positioning pin body receiving slot 42. The plate further includes other bolt hole alignment slots 48, 50 and 52.

The intermediate plate 32 has a central opening 54 and also has a radially extending, enlarged, positioning pin body receiving slot 56. In addition, the intermediate plate 32 contains a plurality of threaded bolt receiving openings 58, arrayed thereabout in a specific pattern to accommodate all known combinations of bolt hole orientations in wheel rims having four, five, six and eight bolt holes, so that at least two bolt holes of any such rim may be in alignment with two of the holes 58 in plate 32.

The top plate 34 includes a center opening 60 and also includes an enlarged radially extending, positioning pin body receiving slot 62 extending radially away from the center opening 60. The top further includes a reduced positioning pin tip receiving opening 64 laterally displaced from the slot 62. The top is provided with a master bolt hole alignment slot 66 and other bolt hole alignment slots 68, 70 and 72 with all of the slots and openings in the top 34 being in registration with the corresponding slots and openings in the bottom 30.

A hub 74 extends through the openings 40, 54 and 60 in the bottom, intermediate and top plates, and is welded to the top and bottom plates as shown at 74a and 74b. The hub 74 has a hollow interior 76 for impalement over the column 16 and, in particular, the threaded portion 16b thereof. The medial exterior portion 78 of hub 74 provides a bearing surface with respect to the opening 54 of intermediate plate 32 so that intermediate plate 32 may be rotated relative to the hub 74, as well as the lower plate 30 and upper plate 34 of the adapter 10. To facilitate in rotating the intermediate plate 32 relative to the remainder of the assembly, the flange portion 36 of top plate 34 is provided with two slots 80a and 80b and a continuous cable-like strand 82 extends through the slots and about the exterior of the intermediate plate 32 in the confined space 84 between the exterior periphery of the plate 32 and the depending flange 36 of top plate 34. The strand 84 is in frictional engagement with the periphery of intermediate plate 32 so that movement of strand 84 imparts rotation to plate 32.

The adapter 10 may be used for servicing so called decorative rims which may be made of aluminum, magnesium, or have filler material of an epoxy or the like which, in contrast to an ordinary steel rim, may be easily marred or gouged while being supported for a tire servicing operation. Typically, rim 22 will include a central web 86 spanning the annular portion 87 of the rim with the web 86 having a central opening 88. In the case of a decorative rim, a hub 90 may protrude outwardly about the central opening 88, and, in some cases decorative filler material may span the area between the hub 90 and the annular portion 87. In addition, the rim is provided with a plurality of bolt openings 92 which, depending upon the type and make of rim, may consist of four, five, six or eight such openings.

The stand 12 is first made ready for use in servicing a decorative rim 22 or the like by placing the adapter 10 as shown in FIG. 2, with the top surface 34 facing upwardly and, the slot 66 facing generally perpendicularly to the bead-breaker shoes 28. The reduced tip 15a of the positioning pin 15 will then be aligned and impaled through the hole 44 in the bottom plate 30. In the tire changing stand 12 of the type described in the aforementioned Strang U.S. Pat. No. 3,255,800, the positioning pin 15 is spring loaded, but will support the weight of the adapter 10 elevated above the recess or well 14a by virtue of the reception of the reduced tip 15a in the opening 44. Next, the rim 22 is placed over the adapter 10 with the center opening 88 of the rim impaled over the column 16 and the rim web 86 is brought into facial engagement with the top 34 of adapter 10. The weight of the rim and associated tire overcomes the spring loading of the pin 15 so that the adapter 10 and rim 22 drop until the rim flange engages the rim supporting surface 14 which, in most cases of decorative rims, will still position the adapter 10 well above the recess 14a, in that most such decorative rims are wider than conventional metal rims. The rim 22 is rotated so that one of the bolt holes thereof is in alignment with the master bolt hole alignment slot 66 in top 34. Depending on the number of bolt holes of the rim 22, whether there be four, five, six or eight, one of the other bolt holes will be in alignment with one of the other slots 68, 70 and 72, which are positioned 90°, 144° and 240° away counterclockwise, respectively, from the slot 66. A threaded bolt receiving opening of the plate 32 may then be brought in alignment with the master slot 66 and one of the other slots 68, 70 or 72 by merely pulling strand 82, which will cause the plate 32 to rotate relative to the hub 74 until such time as the alignment of the bolt holes with the necessary two slots is obtained. Following this, lug bolts 94 with reduced ends 96, as shown and described in greater detail in Scott U.S. Pat. No. 3,474,840, are threaded through the bolt openings 92 in the rim and into the two aligned openings 58 in the plate 32 to secure the rim 22 with respect to the adapter 10. Since the adapter 10 is also impaled on positioning pin 15a, the rim is also held against rotation relative to the rim receiving surface 14 of the stand 12. Such securement may be sufficient to mount the rim 22 and tire 20 with respect to the stand 12 for the necessary servicing functions. However, it may be desirable to further utilize the cone clamp 18, and for this purpose, an adapter accessory 98 may be utilized. Adapter accessory 98 is a sleeve-like member having an interior of a size and shape to closely embrace the threaded periphery 16b of column 16 and is extremely thin in cross-section. The adapter has a flanged portion 100 at one end thereof so that it may be impaled over the column 16 until such time as the flange 100 abuts adapter hub 74. Following this, the cone clamp 18 may be threaded about the threaded portion 16b of the column 16 until it abuts the flange 100 of the sleeve 98. It is preferred that the sleeve, or adapter accessory 98, be made of an extremely strong rigid material, such as steel or the like, so that any forces imposed on the flange portion 100 thereof, will protect the hub portion 90 of the decorative rim from any marring or gouging or the like.

When the adapter 10 is used for receiving rims of small dimensions, such as the so-called 10 inch rims, the adapter is oriented as shown in FIG. 3, with the bottom plate 30 facing upwardly. The body of the positioning pin 15 extends completely through slots 42, 56, and 62 so that the top plate 34 is in facial engagement with the recess 14a. The short skirt portions 38a protrude upwardly and outwardly when the adapter is oriented as described, so that they can bear against the interior of the annular surface 87 of a small rim and thereby assist in retention of the rim relative to the receiving surface 14 when the rim is secured with the aid of the clamp 18.

Figure 4:
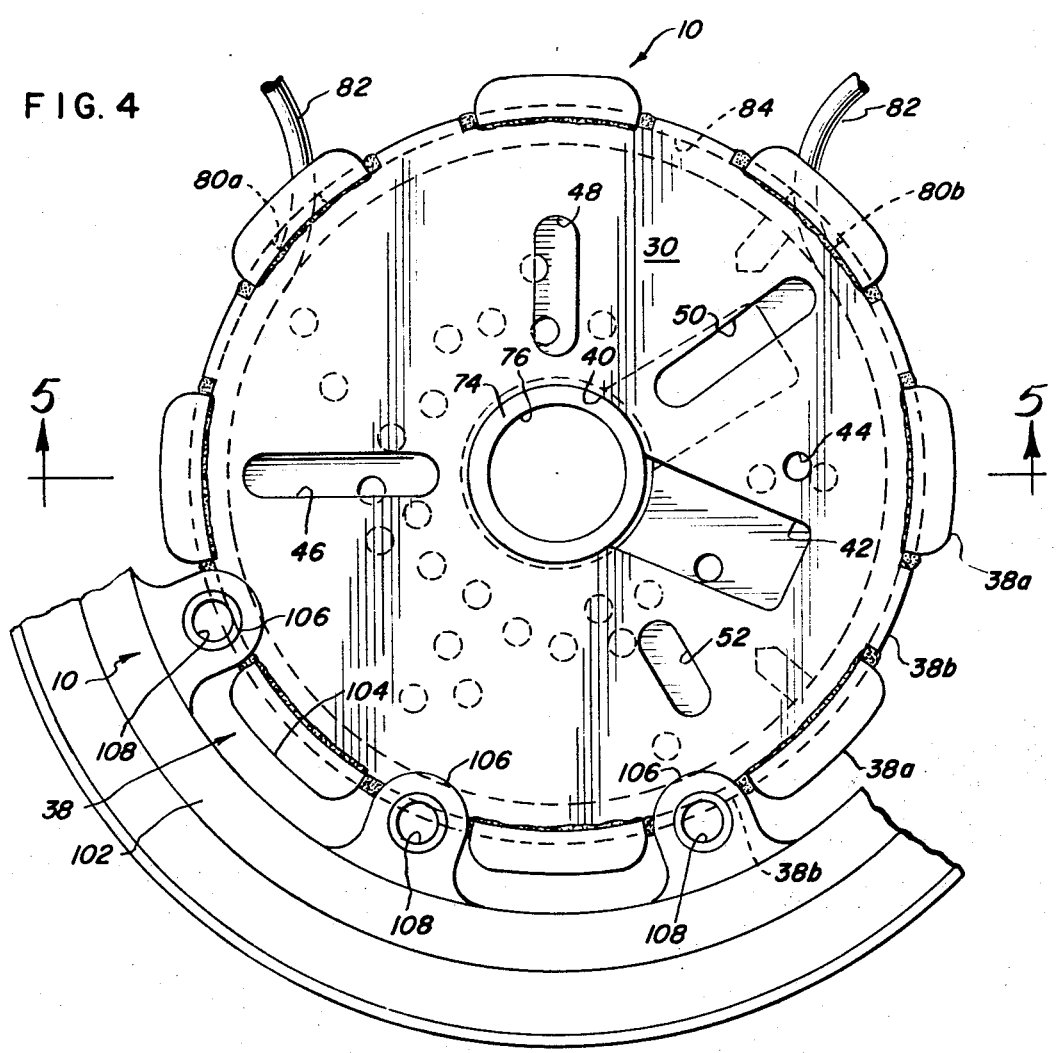
FIG. 4 is a bottom plan view of the adapter of this invention.
Figure 6:
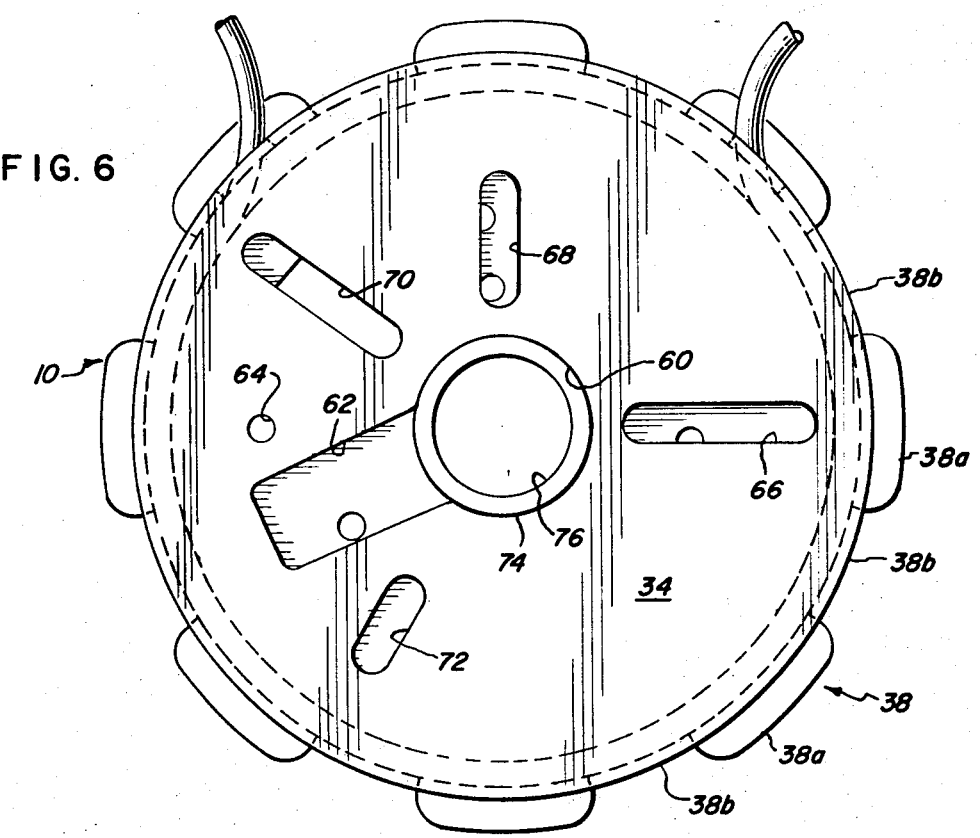
FIG. 6 is a top plan view of the adapter of this invention.
Figure 7:
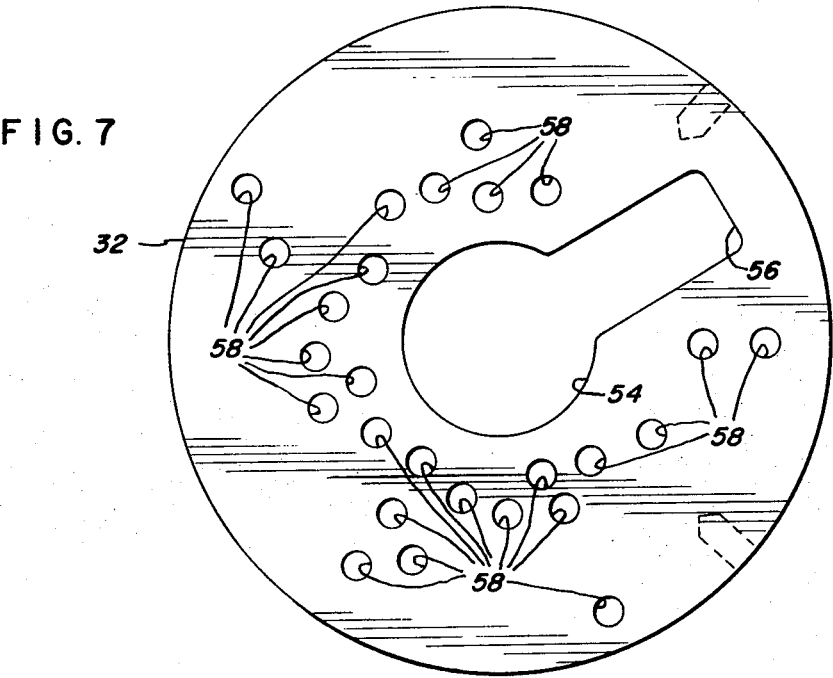
FIG. 7 is a plan view of the intermediate plate utilized with the adapter of this invention.

The adapter of this invention may also be utilized for retaining special rims 102 as fragmentarily illustrated in FIG. 4. Rim 102 has an extremely large center opening 104 so that it is substantially devoid of a web portion similar to web 86 shown with respect to rim 22. The rim has a plurality of radially inwardly extending ears 106 with bolt openings 108 therein. By first placing the rim 102 on the rim receiving surface 14, and then locating the adaptor 10 on the center post 16 with the flared skirt portions 38a extending downwardly, the latter may be received in the spaces between the ears 106 while the ears 106 are received in the spaces 38b between the skirt portions 38a. The conical clamping member 18 may then be applied in a conventional fashion and caused to bear against the plate 34. As a result, the meshing relationship between the ears 106 and spaces 38b will insure that the rim 102 is centered relative to the column 16 while the clamping force applied to the rim via the adaptor 10 by the conical clamping member 18 secures the rim 102 against removal from the rim receiving area during operation of the bead breaker shoes 28 and 29.

The adapter 10 of this invention replaces three different adapters formerly necessary to accommodate decorative rims, such as rim 22, small rims and special rims such as rim 102. Moreover, when used with decorative rims, only two bolts 94 are necessary for fastening the rim 22 to the adapter 10.

Alignment of rim bolt holes 92 with fastener receiving holes 58 of the plate 32 is simplified by making the plate 32 movable within the adapter 10 and by the fact that the one bolt 94 is also mounted through a master slot 66 in the adapter 10. Thus, the adapter 10 of this invention combines three different functions in one piece of equipment and further simplifies the use of the adapter 10 in carrying out its intended functions.

The foregoing detailed description has been given for clearness of understanding only, and no unnecessary limitations should be understood therefrom, as some modifications may be obvious to those skilled in the art.

We claim:

1. An adapter for use with a tire changing stand comprising: means defining a housing having a lower portion and upper portion, said housing including a central aperture for receiving the center post of the tire changing stand, said housing further including a plurality of openings in the upper portion spaced about the central aperture; and a fastener receiving member movably positioned in the housing below the upper portion, said fastener receiving member having fastener receiving openings therein arranged thereabout in a pattern for registration with at least two of said bolt receiving openings of a vehicle rim, and means for moving said fastener receiving member so that the fastener receiving openings thereof may be aligned with the housing upper portion openings.

2. The adapter of claim 1 wherein said housing has a generally scalloped periphery.

3. The adapter of claim 1 wherein the periphery of said adapter includes portions which diverge outwardly and downwardly away therefrom.

4. The adapter of claim 1 wherein said fastener receiving member also includes a central aperture for receiving the center post of a tire changing stand.

5. The adapter of claim 1 wherein strand means is associated with said fastener receiving member plate for moving said fastener receiving member relative to said housing to align the openings in the fastener receiving member with the openings in the housing upper portion.

6. The adapter of claim 1 wherein the lower portion of said housing includes a reduced positioning pin receiving aperture for receiving the reduced free end portion of a tire changing stand positioning pin.

7. The adapter of claim 1 wherein said housing upper and lower portions and said medial fastener receiving plates include a positioning pin body receiving slot of a size and shape to telescopically receive the body of a positioning pin of a tire changing stand therethrough.

8. The adapter of claim 1 including, for use therewith, a sleeve member of a size and shape to be received about the center post of the tire changing stand and having a flange at one end thereof for protecting the wheel about the center opening of a vehicle rim with which the adapter is used.

9. The adapter of claim 1 wherein one of the openings in the housing upper portion is a master opening intended for placement adjacent to the beadbreaker shoes of a tire changing stand with the other openings being spaced about the housing upper portion in spaced segments corresponding to the number of bolt holes of wheel rims intended for use therewith.

10. An adapter for use with a tire changing stand of the type having a rim receiving area, a column extending uprightly from said rim receiving area, and a positioning pin with a reduced end laterally displaced from said column, comprising: means defining a housing including a lower member and an upper member and a fastener receiving member between said lower and upper members, each of said fastener receiving upper and lower members having aligned column receiving openings and further having positioning pin receiving openings, with the lower member further having a positioning pin reduced end aperture; said upper and lower members further having spaced fastener receiving slots; said fastener receiving member having fastener receiving openings therein arranged thereabout in a pattern for registration with at least two bolt receiving openings of a vehicle rim; and means mounting said fastener receiving member for movement relative to said housing so that the fastener receiving openings thereof and said positioning pin opening thereof may be aligned with said upper and lower member openings.

* * * * *